(12) United States Patent
Abt, Jr. et al.

(10) Patent No.: US 10,084,606 B2
(45) Date of Patent: Sep. 25, 2018

(54) CONSTRUCTION OF DIGITAL IDENTITY DOCUMENTS IN A MANNER THAT ALLOWS THE USER TO SELECT WHICH ATTRIBUTES ARE TO BE REVEALED

(71) Applicant: International Business Machines Corporation, Armonk, NY (US)

(72) Inventors: William F. Abt, Jr., Nashua, NH (US); Daniel A. Gisolfi, Hopewell, NY (US); Asher C. Johnson, Austin, TX (US); Aaron K. Reed, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 130 days.

(21) Appl. No.: 15/130,683

(22) Filed: Apr. 15, 2016

(65) Prior Publication Data

US 2017/0302455 A1 Oct. 19, 2017

(51) Int. Cl.
*H04L 29/06* (2006.01)
*H04L 9/32* (2006.01)

(52) U.S. Cl.
CPC ........ *H04L 9/3247* (2013.01); *H04L 63/0823* (2013.01)

(58) Field of Classification Search
CPC .. G06F 21/6245; G06F 17/248; G06F 17/211; H04L 9/3247; H04L 63/0823
USPC ........................................................ 713/176
See application file for complete search history.

(56) References Cited

U.S. PATENT DOCUMENTS

| | | | |
|---|---|---|---|
| 6,633,311 B1* | 10/2003 | Douvikas | G06Q 10/10 715/731 |
| 7,143,095 B2 | 11/2006 | Barrett et al. | |
| 2006/0224611 A1* | 10/2006 | Dunn | G06F 21/6245 |
| 2007/0041628 A1 | 2/2007 | Fan | |
| 2007/0100785 A1 | 5/2007 | Hackmann et al. | |
| 2007/0185814 A1 | 8/2007 | Boccon-Gibod et al. | |
| 2015/0117701 A1 | 4/2015 | Ross et al. | |

(Continued)

OTHER PUBLICATIONS

Anonymously, "Method to Map a Client Certificate to a User Identity," IP.Com, IPCOM000207272D, May 24, 2011, pp. 1-2.

(Continued)

*Primary Examiner* — Yogesh Paliwal
(74) *Attorney, Agent, or Firm* — Robert A. Voigt, Jr.; Winstead, P.C.

(57) ABSTRACT

A method, system and computer program product for facilitating the generating of digital identity documents. A system receives a selection and initialization of properties (e.g., identity attributes, document type, alternate views, an acquisition uniform resource locator (URL)) to be used in a digital identity document (e.g., driver's license). The system then builds a template using the selected properties. The system may then present a list of built templates to a user/verifier to be used in generating a corresponding digital identity document. Upon receiving the selected template, the system provides the acquisition URL associated with the selected template to the user/verifier to be used by the user/verifier to request the corresponding digital identity document from the issuer. After receiving the digital identity document constructed by the issuer from the issuer, the system delivers the received digital identity document to the user/verifier.

20 Claims, 4 Drawing Sheets

(56) References Cited

U.S. PATENT DOCUMENTS

2016/0188547 A1\* 6/2016 Cruzada ................ G06F 17/211
715/749

OTHER PUBLICATIONS

Anonymously, "Extensible Framework for Automated Extraction of Information About Identities from Unstructured Information Sources," IP.com, IPCOM000240102D, Jan. 2, 2015, pp. 1-7.

Asher C. Johnson et al., "Mobile Identity You are the Center of Your Identity," handout and demonstration thereof provided at the American Association of Motor Vehicle Administrators' Worship and Law Institute Conference held on Mar. 9-10, 2016 in Cincinnati, Ohio, one page, Grace Period Disclosure.

Matsumoto et al., "Evaluating Security of a Clone Preventive Technique Using Physical Randomness and cryptography," Proceedings of SPIE, vol. 3973, Apr. 7, 2000, pp. 139-152.

\* cited by examiner

US 10,084,606 B2

CONSTRUCTION OF DIGITAL IDENTITY DOCUMENTS IN A MANNER THAT ALLOWS THE USER TO SELECT WHICH ATTRIBUTES ARE TO BE REVEALED

STATEMENT REGARDING PRIOR DISCLOSURES BY THE INVENTOR OR JOINT INVENTOR

The following disclosure(s) are submitted under 35 U.S.C. 102(b)(1)(A):

Asher C. Johnson et al., "Mobile Identity You are the Center of Your Identity," handout and demonstration thereof provided at the American Association of Motor Vehicle Administrators' Worship and Law Institute Conference held on Mar. 9-10, 2016 in Cincinnati, Ohio.

TECHNICAL FIELD

The present invention relates generally to identity documents, and more particularly to constructing digital identity documents in a manner that allows the user to select which attributes (e.g., name, address, birthdate, age) are to be revealed.

BACKGROUND

Currently, institutions, such as government agencies (e.g., department of motor vehicles), issue identity cards or documents which may be used to identify a person or verify aspects of a person's personal identity. Identity document may include, for example, a driver's license, a fishing license, a hunting license, a passport, a health insurance card, a firearm owner's identification card, a boating license, a commercial driver's license, etc. Typically, such identity documents are issued in the form of a thermal plastic card or paper by these institutions (or "issuer") based on user data (e.g., name, address, birthdate, height, etc. of the user) stored in databases.

Unfortunately, by relying upon thermal plastic cards or paper, there are several drawbacks. For example, when a user presents an identity document, such as to a verifier (e.g., merchant), there is no choice but to present the entire identity document which may include personal information that is not needed to be seen by the verifier. For example, a merchant does not need to know the address of the individual when the individual is purchasing alcoholic beverages to verify that the individual is over 21 years of age. However, when the individual presents a driver's license to the merchant, the merchant will have access to information besides the age of the individual, such as the name and address of the individual.

Other drawbacks include requiring to physically recreate and reissue another identity document based on changes that are reflected in the identity document, such as a change in address or a change in a person's name. However, by physically recreating and reissuing another identity document, there may be a period of time in which the user has no current accurate identity document.

Another drawback is that the ability to present information regarding the services (e.g., phone number of a nurse help line) concerning the particular type of identity document (e.g., health insurance card) is limited based on the physical size and layout of the identity document.

Hence, the current process in issuing identity documents in the form of thermal plastic cards or paper is subject to several drawbacks.

SUMMARY

In one embodiment of the present invention, a method for facilitating the generating of digital identity documents comprises receiving a selection and initialization of properties to be used in a digital identity document. The method further comprises building, by a processor, a template using the selected properties. The method additionally comprises presenting a list of built templates to a user or a verifier to select. Furthermore, the method comprises receiving a notification of a template selected by the user or the verifier from the list of templates to be used in generating a corresponding digital identity document. Additionally, the method comprises providing an acquisition uniform resource locator associated with the selected template to the user or the verifier to be used by the user or the verifier to request the digital identity document from an issuer. In addition, the method comprises receiving the digital identity document from the issuer. The method further comprises delivering the received digital identity document to the user or the verifier.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
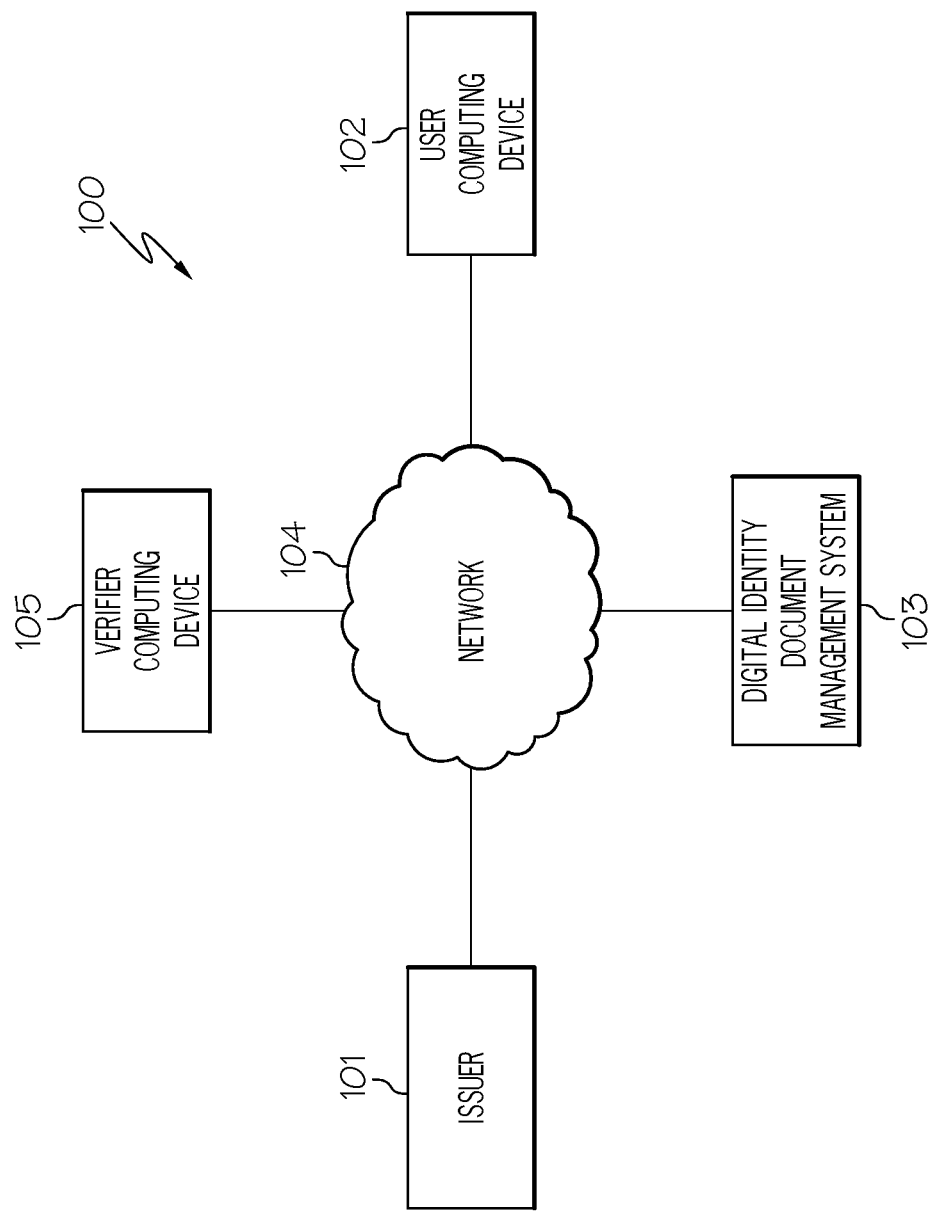
FIG. 1 illustrates a system for delivering digital identity documents to users and verifiers in accordance with an embodiment of the present invention.

The present invention comprises a method, system and computer program product for facilitating the generating of digital identity documents. In one embodiment of the present invention, a system, referred to herein as the "digital identity document management system," receives a selection and initialization of properties to be used in a digital identity document. A "digital identity document," as used herein, refers to a document or card that is used to identify a person or verify aspects of a person's personal identity in digital form. Furthermore, a "digital identity document," as used herein, refers to a document in digital form that lists the identity attribute(s) (e.g., age) and/or identity document type(s) (e.g., driver's license) that a verifier has authority to verify/challenge/request. Examples of properties may include identity attributes (e.g., age, eye color), a document type (e.g., driver's license), alternate views for displaying the digital identity document, an acquisition uniform resource locator (URL) and possibly service URL(s). In another example, properties may include identity attribute(s) and/or identity document type(s) as well as a verifier role, an acquisition URL and possibly service URLs. After receiving the selection and initialization of the properties, the system builds a template using the selected properties. The system may then present a list of built templates to a user or verifier to be used in generating a corresponding digital identity document. Upon receiving a selected template from the list of built templates from the user or verifier, the system provides the acquisition uniform resource locator associated with the selected template to the user or verifier to be used by the user or verifier to request the desired digital identity document from the issuer. After receiving the digital identity document constructed by the issuer from the issuer, the system delivers the received digital identity document to the user or verifier.

As discussed herein, the principles of the present invention allow an identity document to be issued in digital form so as to enhance the flexibility in the size and layout of the identity document thereby being able to offer information of the services (e.g., link to a nurse help website) associated with the selected template (e.g., template for a health insurance card). Furthermore, by utilizing a digital identity document, changes, such as status changes (e.g., change in address), can be practically updated instantaneously in an updated digital identity document. Additionally, as discussed herein, the principles of the present invention allow the user to select which identity attributes (e.g., name, address, birthdate, age) in the digital identity document are to be revealed. In this manner, the user may respond to a verification request with exactly the information the verifier needs to see (e.g., age) without any other personal information being revealed. Furthermore, as discussed herein, the principles of the present invention allow the user to select the type of delivery option, such that the digital identity document can be viewed in many forms, such as a digital identity document to be viewed in Apple Wallet®.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Referring now to the Figures in detail, FIG. 1 illustrates a system 100 for delivering digital identity documents to users and verifiers in accordance with an embodiment of the present invention. A "digital identity document," as used herein, refers to a document or card that is used to identify a person or verify aspects of a person's personal identity in digital form. Examples include, but not limited to, a driver's license, a fishing license, a hunting license, a passport, a health insurance card, a firearm owner's identification card, a boating license, and a commercial driver's license. Furthermore, a "digital identity document," as used herein, refers to a document in digital form that lists the identity attribute(s) (e.g., age) and/or identity document type(s) (e.g., driver's license) that a verifier 105 (discussed further below) has authority to verify/challenge/request.

As illustrated in FIG. 1, system 100 includes an issuer 101, such as a government agency (e.g., department of motor vehicles), that is responsible for issuing a digital identity document based on data stored on secured servers/databases (not shown in FIG. 1) accessible by issuer 101. Such data for digital identity documents issued to users 102 (discussed further below) may include personal data of users, such as name, address, birthdate, height and eye color. The principles of the present invention are not to be limited in scope to particular types of identity documents or the data stored to generate such identity documents. The principles of the present invention are to include any type of identity document that is used for identifying a person or verifying aspects of a person's personal identity regardless of the type of data in the identity document. In one embodiment, issuer 101 issues a digital identity document to user 102 or verifier 105 based on a template selected by user 102 or verifier 105, respectively, as discussed further below.

System 100 further includes a user computing device 102 (the user's computing device as well as the user himself/herself may each be identified with element number 102) connected to issuer 101 and a digital identity document management system 103 via a network 104. Computing device 102 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to network 104 and consequently communicating with issuer 101 and digital identity document management system 103 as discussed herein.

Network 104 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Digital identity document management system 103 is configured to build "templates" defined by issuer 101 which are used by issuer 101 to generate digital identity documents. These templates, such as those selected by user 102, are built based on properties (e.g., document type, such as a driver's license, alternate views, such as viewing the digital identity document in Apple Wallet®, and identity attributes, such as age, height and eye color) selected and initialized by issuer 101. Each such template may include a property of the acquisition uniform resource locator, which may be specified by issuer 101. Furthermore, each such template may include a property of service uniform resource locator(s) (e.g., a link to contact information, a link to common billing questions and answers, a link to a nurse help website). As discussed further below, such templates may be used by issuer 101 to construct a particular digital identity document selected by user 102. Since the identity document is in digital form, user 102 has the ability to select which attribute values (e.g., age, height, address) to reveal to verifier 105 during a challenge as discussed further below. In this manner, digital identity document management system 103 allows digital identity documents to be constructed in a manner that allows user 102 to select which attributes are to be revealed, such as during a challenge made by verifier 105.

Furthermore, templates, such as those selected by verifier 105, are also built based on properties (e.g., document type, such as a driver's license, identity attributes, such as age, height and eye color, and role type) selected and initialized by issuer 101. A "role," as used herein, refers to the customary function performed by verifier 105. Examples of roles include a law enforcement role or a merchant role. Additionally, each such template may also include a property of the acquisition uniform resource locator, which may be specified by issuer 101. Furthermore, each such template may also include a property of service uniform resource locator(s) (e.g., a link to contact information, a link to common billing questions and answers, a link to a nurse help website). As discussed further below, such templates may be used by issuer 101 to construct a particular digital identity document that lists the identity attribute(s) and/or identity document(s) (e.g., driver's license) that a verifier 105 has authority to request. As further discussed below, the digital identity document may be used by verifier 105 during a "challenge" with user 102.

These and other features of digital identity document management system 103 will be discussed further below. In one embodiment, digital identity document management system 103 provides the services of delivering a digital identity document requested by user 102 or verifier 105 as a cloud service. A hardware configuration of digital identity document management system 103 is discussed below in connection with FIG. 2.

Furthermore, as illustrated in FIG. 1, a verifier computing device 105 (the verifier's computing device as well as the verifier himself/herself may each be identified with element number 105) is connected to network 104 to allow a verifier 105, such as a law enforcement officer or a merchant, to select a template to be used by issuer 101 to build a digital identity document that lists the identity attribute(s) and/or identity document(s) that a verifier 105 (discussed further below) has authority to request. While FIG. 1 illustrates verifier 105 and user 102 connected to each other via network 104, verifier 105 and user 102 may be connected to each via other means, such as via near field communication.

System 100 is not to be limited in scope to any one particular network architecture. System 100 may include any number of issuers 101, user computing devices 102, digital identity document management systems 103, networks 104 and verifier computing devices 105.

Figure 2:
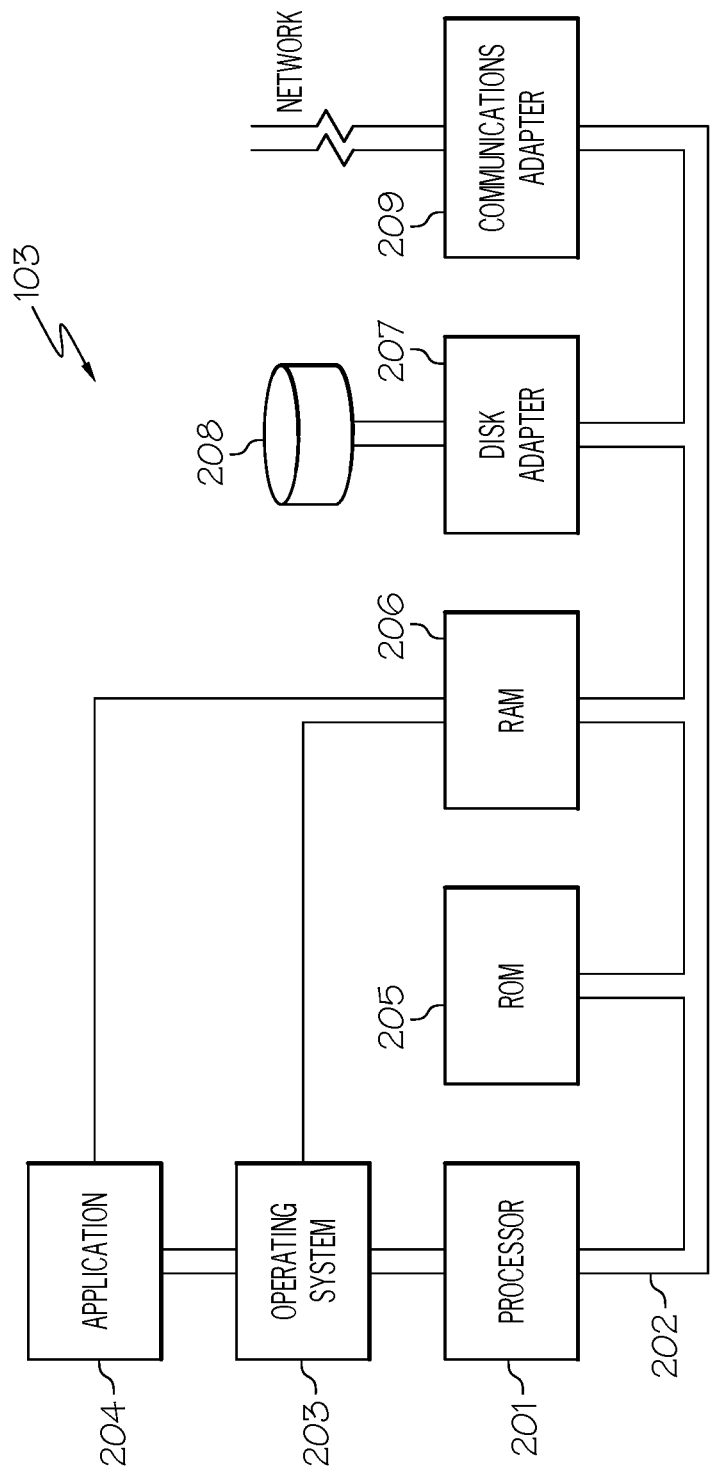
FIG. 2 illustrates a hardware configuration of a digital identity document management system for practicing the principles of the present invention in accordance with an embodiment of the present invention.

Referring now to FIG. 2, FIG. 2 illustrates a hardware configuration of digital identity document management system 103 (FIG. 1) which is representative of a hardware environment for practicing the present invention. Referring to FIG. 2, digital identity document management system 103 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for facilitating the generating of digital identity documents by issuer 101 to users 102 and verifiers 105 using templates as discussed below in connection with FIGS. 3-7.

Referring again to FIG. 2, read-only memory ("ROM") 205 is coupled to system bus 202 and includes a basic input/output system ("BIOS") that controls certain basic functions of digital identity document management system 103. Random access memory ("RAM") 206 and disk adapter 207 are also coupled to system bus 202. It should be noted that software components including operating system 203 and application 204 may be loaded into RAM 206, which may be digital identity document management system's 103 main memory for execution. Disk adapter 207 may be an integrated drive electronics ("IDE") adapter that communicates with a disk unit 208, e.g., disk drive. It is noted that the program for facilitating the generating of digital identity documents by issuer 101 to users 102 and verifiers 105 using templates, as discussed below in connection with FIGS. 3-7, may reside in disk unit 208 or in application 204.

Digital identity document management system 103 may further include a communications adapter 209 coupled to bus 202. Communications adapter 209 interconnects bus 202 with an outside network (e.g., network 104 of FIG. 1) thereby enabling digital identity document management system 103 to communicate with other devices (e.g., issuer 101, user computing device 102 and verifier computing device 105 of FIG. 1).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, currently, institutions, such as government agencies (e.g., department of motor vehicles), issue identity cards or documents which may be used to identify a person or verify aspects of a person's personal identity. Identity document may include, for example, a driver's license, a fishing license, a hunting license, a passport, a health insurance card, a firearm owner's identification card, a boating license, a commercial driver's license, etc. Typically, such identity documents are issued in the form of a thermal plastic card or paper by these institutions (or "issuer") based on user data (e.g., name, address, birthdate, height, etc. of the user) stored in databases. Unfortunately, by relying upon thermal plastic cards or paper, there are several drawbacks. For example, when a user presents an identity document, such as to a verifier (e.g., merchant), there is no choice but to present the entire identity document which may include personal information that is not needed to be seen by the verifier. For example, a merchant does not need to know the address of the individual when the individual is purchasing alcoholic beverages to verify that the individual is over 21 years of age. However, when the individual presents a driver's license to the merchant, the merchant will have access to information besides the age of the individual, such as the name and address of the individual. Other drawbacks include requiring to physically recreate and reissue another identity document based on changes that are reflected in the identity document, such as a change in address or a change in a person's name. However, by physically recreating and reissuing another identity document, there may be a period of time in which the user has no current accurate identity document. Another drawback is that the ability to present information regarding the services (e.g., phone number of a nurse help line) concerning the particular type of identity document (e.g., health insurance card) is limited based on the physical size and layout of the identity document. Hence, the current process in issuing identity documents in the form of thermal plastic cards or paper is subject to several drawbacks.

The principles of the present invention provide a means for allowing institutions to no longer rely upon thermal plastic cards or paper for identity documents, but instead, to be able to issue an identity document in digital form so as to enhance the flexibility in the size and layout of the identity document thereby being able to offer information of the services (e.g., link to a nurse help website) associated with the selected template (e.g., template for a health insurance card). Furthermore, by utilizing a digital identity document, changes, such as status changes (e.g., change in address), can be practically updated instantaneously in an updated digital identity document. Additionally, as discussed herein, the principles of the present invention allow the user to select which identity attributes (e.g., name, address, birthdate, age) in the digital identity document are to be revealed. In this manner, the user may respond to a verification request with exactly the information the verifier needs to see (e.g., age) without any other personal information being revealed. For example, a bartender can now be prevented from viewing the user's address or even birthdate since all the bartender needs to know is the age of the user. Furthermore, as discussed herein, the principles of the present invention allow the user to select the type of delivery option, such that the digital identity document can be viewed in many forms, such as a digital identity document to be viewed in Apple Wallet®. These and other aspects of the present invention are discussed below in connection with FIGS. 3-7.

Figure 3:
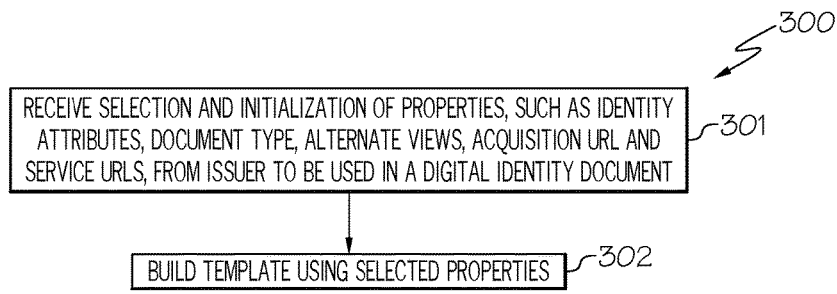
FIG. 3 is a flowchart of a method for building templates upon which various types of digital identity documents to be delivered to users are generated in accordance with an embodiment of the present invention.
Figure 4:
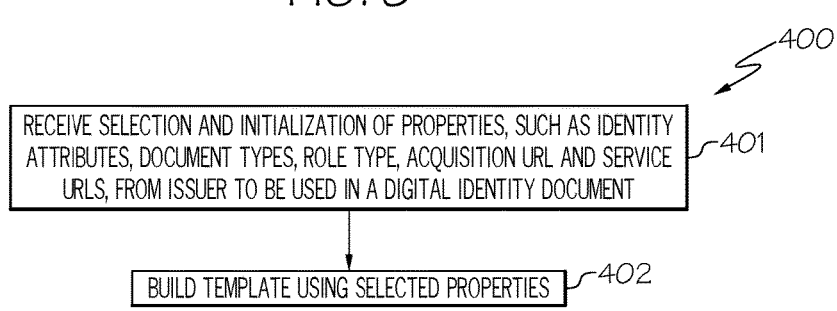
FIG. 4 is a flowchart of a method for building templates upon which digital identity documents to be delivered to verifiers are generated in accordance with an embodiment of the present invention.
Figure 5:
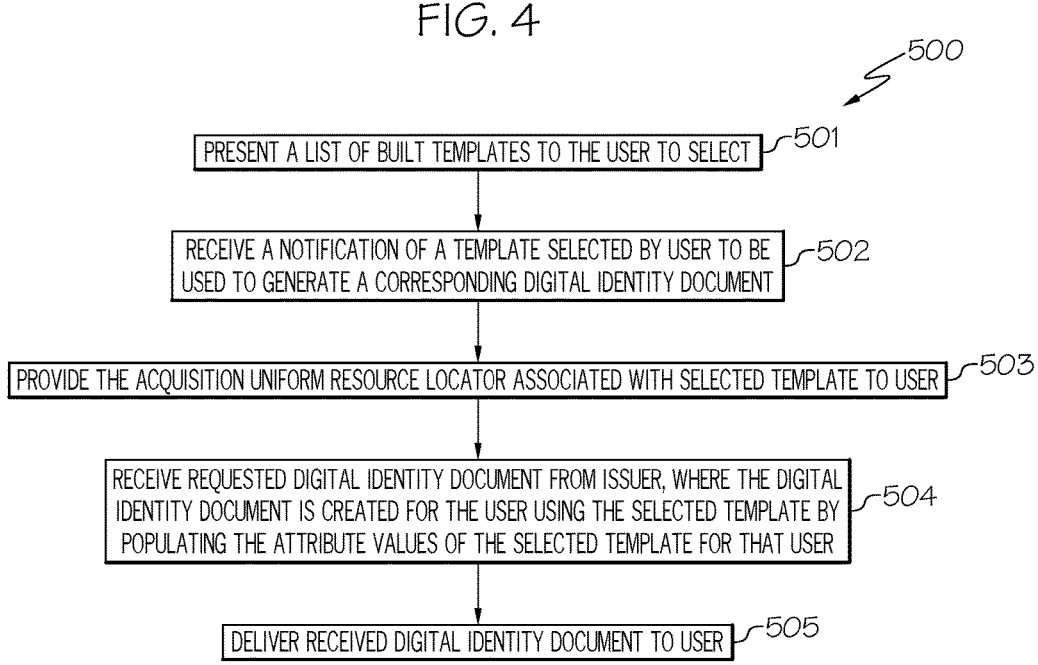
FIG. 5 is a flowchart of a method for delivering a digital identity document constructed by an issuer to the user based on a template selected by the user in accordance with an embodiment of the present invention.
Figure 6:
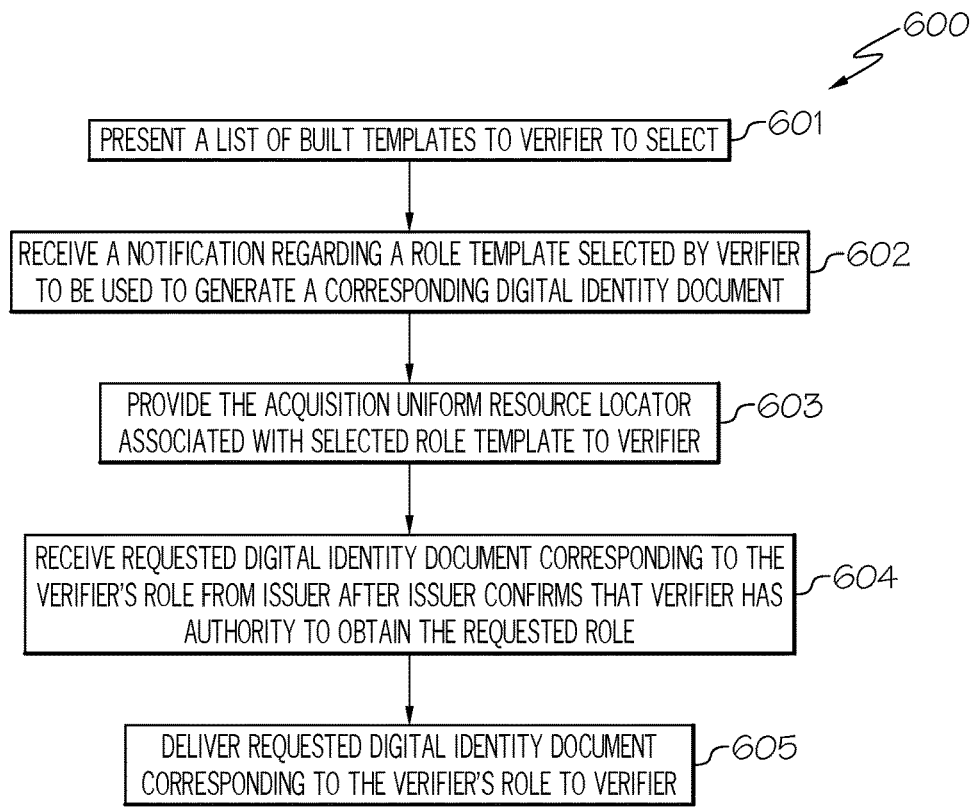
FIG. 6 is a flowchart of a method for delivering a digital identity document constructed by an issuer to the verifier based on a template selected by the verifier in accordance with an embodiment of the present invention.
Figure 7:
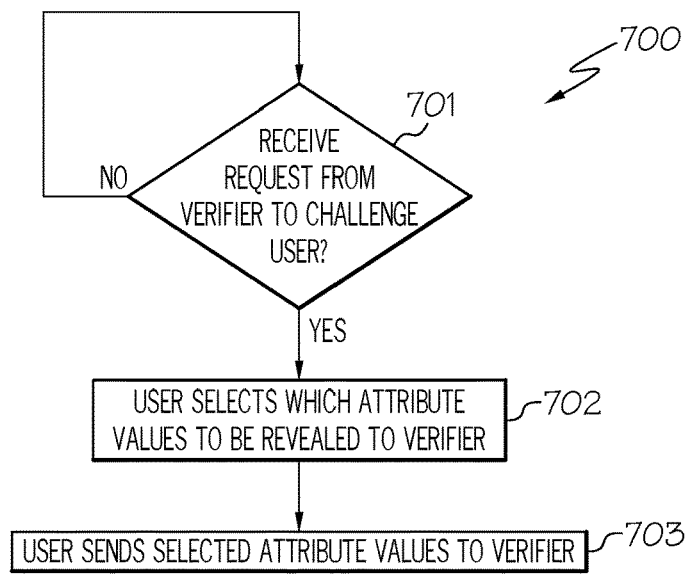
FIG. 7 is a flowchart of a method for the user controlling which attribute values to be revealed to the verifier during a challenge by the verifier in accordance with an embodiment of the present invention.

FIG. 3 is a flowchart of a method for building templates upon which various types of digital identity documents to be delivered to users 102 (FIG. 1) are generated. FIG. 4 is a flowchart of a method for building templates upon which digital identity documents to be delivered to verifiers 105 (FIG. 1) are generated. FIG. 5 is a flowchart of a method for delivering a digital identity document constructed by an issuer 101 (FIG. 1) to user 102 based on a template selected by user 102. FIG. 6 is a flowchart of a method for delivering a digital identity document constructed by an issuer 101 to verifier 105 based on a template selected by verifier 105. FIG. 7 is a flowchart of a method for user 102 controlling which attribute values to be revealed to verifier 105 during a challenge by verifier 105.

As stated above, FIG. 3 is a flowchart of a method 300 for building templates upon which various types of digital identity documents to be delivered to users 102 (FIG. 1) are generated in accordance with an embodiment of the present invention.

Referring to FIG. 3, in conjunction with FIGS. 1-2, in step 301, digital identity document management system 103 receives a selection and initialization of properties, such as identity attributes (e.g., name, address, birthdate, height, eye color), document types (e.g., driver's license), alternate views (e.g., view digital identity document in Apple Wallet®) for displaying the digital identity document, acquisition uniform resource locator (URL) and service URL(s), from issuer 101 to be used in a digital identity document (e.g., a driver's license, a fishing license, a hunting license, a passport, a health insurance card, a firearm owner's identification card, a boating license, a commercial driver's license, etc.). The acquisition URL may be used by user 102 to obtain the desired digital identity document as discussed further below.

In step 302, digital identity document management system 103 builds a template using the selected properties, where the template is to be used by issuer 101 to construct a particular type of digital identity document (e.g., driver's license).

Digital identity document management system 103 also builds templates upon which digital identity documents are to be delivered to verifiers 105 as discussed below in connection with FIG. 4.

FIG. 4 is a flowchart of a method 400 for building templates upon which digital identity documents to be delivered to verifiers 105 are generated in accordance with an embodiment of the present invention.

Referring to FIG. 4, in conjunction with FIGS. 1-2, in step 401, digital identity document management system 103 receives a selection and initialization of properties, such as identity attributes (e.g., name, address, birthdate, height, eye color), document types (e.g., driver's license), role type (e.g., law enforcement role), acquisition uniform resource locator (URL) and service URL(s), from issuer 101 to be used in a digital identity document. The properties, such as identity attributes and/or document types (types of identity documents), selected by issuer 101 indicate which identity attributes and/or identity documents verifier 105 may request from user 102 based on the role of verifier 105. That is, issuer 101 selects and initializes the properties to be used to represent the authority of verifier 105 to user 102. Furthermore, the property of the acquisition URL may be used by verifier 105 to obtain the desired digital identity document as discussed further below.

In step 402, digital identity document management system 103 builds a template using the selected properties, where the template is to be used by issuer 101 to construct the digital identity document that lists the identity attribute(s) and/or identity document(s) that verifier 105 has authority to request based on the role (e.g., law enforcement role) of verifier 105.

The built templates discussed in FIGS. 3 and 4 can be used by issuer 101 to construct digital identity documents based on these templates for users 102 and verifiers 105 as discussed below in connection with FIGS. 5 and 6.

FIG. 5 is a flowchart of a method 500 for delivering a digital identity document constructed by an issuer 101 (FIG. 1) to a user 102 (FIG. 1) based on a template selected by user 102 in accordance with an embodiment of the present invention.

Referring to FIG. 5, in conjunction with FIGS. 1-3, in step 501, digital identity document management system 103 presents a list of built templates (templates built in step 302) to user 102 to select. In one embodiment, user 102 may be presented with a list of templates via a user interface and select a template via any of the input means of computing device 102. As discussed above, the template may include a listing of identity attributes as well as the type of identity document and alternate views. As a result, user 102 may be able to not only select the template corresponding to the desired identity document with the desired identity attributes but also control the display layout and output form of the identity document in digital form. For example, user 102 may desire to have the digital identity document delivered in Apple Wallet® if such a view is defined as one of the alternate views.

In step 502, digital identity document management system 103 receives a notification of a template being selected by user 102 out of the list of built templates presented to user 102 which will be used to generate a corresponding digital identity document (e.g., a driver's license, a fishing license, a hunting license, a passport, a health insurance card, a firearm owner's identification card, a boating license, a commercial driver's license, etc.).

In step 503, digital identity document management system 103 provides the acquisition uniform resource locator (URL) associated with the selected template to user 102 in response to user 102 selecting the template. As discussed above, each template may be associated with an acquisition URL. In one embodiment, the user of computing device 102 utilizes the received acquisition URL to communicate with issuer 101 to request a digital identity document to be constructed based on the template selected by user 102.

In step 504, digital identity document management system 103 receives the requested digital identity document from issuer 101, where the digital identity document is created for user 102 using the template selected by user 102 by populating the values for the identity attributes (e.g., birthdate, name) in the selected template (e.g., template for driver's license) for that user 102.

In step 505, digital identity document management system 103 delivers the received digital identity document to user 102. In one embodiment, user 102 may select the layout of choice based on the available alternate views (specified as a property in the selected template) (e.g., deliver the digital identity document in Apple Wallet®). As a result, user 102 now has control over the display layout and output form of the digital identity document. Consequently, digital identity document management system 103 delivers the received digital identity document to user 102 using a layout specified as a property in the selected template.

Furthermore, as discussed above, the delivered digital identity document may contain service URLs (specified as a property in the selected template). Such service URLs (e.g., a link to contact information, a link to common billing questions and answers, a link to a nurse help website) may be utilized by user 102 to obtain additional information.

Similarly, the template built by digital identity document management system 103 can be used by issuer 101 to construct a digital identity document for verifier 105 that indicates the identity attribute(s) and/or identity document(s) that verifier 105 has authority to request based on the role (e.g., law enforcement role) of verifier 105 as discussed below in connection with FIG. 6.

FIG. 6 is a flowchart of a method 600 for delivering a digital identity document constructed by an issuer 101 to verifier 105 based on a template selected by verifier 105 in accordance with an embodiment of the present invention.

Referring to FIG. 6, in conjunction with FIGS. 1-2 and 4, in step 601, digital identity document management system 103 presents a list of built templates (templates built in step 402) (also referred to as "role templates") to verifier 105 to select. That is, digital identity document management system 103 presents a list of templates to verifier 105 to select in order for verifier 105 to obtain a digital identity document corresponding to the verifier's role (e.g., merchant role) that lists the document(s) and/or attribute(s) that verifier 105 has authority to request.

In step 602, digital identity document management system 103 receives a notification regarding a role template being selected by verifier 105 out of the list of built templates presented to verifier 105 to be used to generate a corresponding digital identity document.

In step 603, digital identity document management system 103 provides the acquisition uniform resource locator (URL) associated with the selected role template to verifier 105. As discussed above, each template may be associated with an acquisition URL. In one embodiment, verifier 105 utilizes the received acquisition URL to communicate with issuer 101 to request a digital identity document to be constructed based on the role template selected by verifier 105.

In step 604, digital identity document management system 103 receives the requested digital identity document corresponding to the verifier's role from issuer 101 after issuer 101 confirms that verifier 105 has authority to obtain the requested role (e.g., law enforcement role). As discussed above, the digital identity document is created for verifier 105 using the role template selected by verifier 105. In one embodiment, such a digital identity document includes the identity attribute(s) (e.g., age) and/or identity document(s) (e.g., driver's license) that verifier 105 has authority to request based on the role (e.g., law enforcement role) of verifier 105. In one embodiment, issuer 101 (e.g., law enforcement agency) only creates the digital identity document for verifier 105 after verifier 105 has established authority for the indicated role (e.g., law enforcement role), such as by entering credentials (e.g., badge number) in an appropriate issuer managed website (e.g., law enforcement agency website).

In step 605, digital identity document management system 103 delivers the requested digital identity document corresponding to the verifier's role to verifier 105.

Furthermore, as discussed above, the delivered digital identity document may contain service URLs (specified as a property in the selected template). Such service URLs may be utilized by verifier 105 to obtain additional information.

Once user 102 and verifier 105 have received their digital identity documents, verifier 105 may attempt to verify attribute values (e.g., age) in the digital identity document (e.g., driver's license) delivered to the user of computing device 102. Such a verification process may be referred to as a "challenge." For instance, a police officer may attempt to verify the age of the user indicated in a digital driver's license using a mobile scanner. The police officer may be said to issue a challenge to the user 102 (also referred to as the "owner") as to the validity of the attribute values contained in the digital identity document. The user or owner 102 may then respond to the challenge by selecting only those attribute values (e.g., age) (whether from one or more digital identity documents) to be transmitted to verifier 105 as discussed below in connection with FIG. 7.

FIG. 7 is a flowchart of a method for user 102 controlling which attribute values to be revealed to verifier 105 during a challenge by verifier 105 in accordance with an embodiment of the present invention.

Referring to FIG. 7, in conjunction with FIGS. 1-6, in step 701, a determination is made by user 102 as to whether user 102 received a request from verifier 105 to challenge user 102.

If user 102 did not receive a challenge from verifier 105, then user 102 continues to determine if user 102 received a challenge from verifier 105 in step 701.

If, however, user 102 received a challenge from verifier 105, then, in step 702, user 102 selects which attribute values are to be revealed to verifier 105. For example, user 102 may possess a digital identity document (e.g., driver's license) that includes the user's name, address, driver's license number, date of birth, height and eye color. However, if verifier 105 is a merchant requesting to verify the user's age (the challenge), then user 102 may only desire to send verifier 105 the age of user 102. In this manner, user 102 may respond to a verification request with exactly the information verifier 105 needs to see (e.g., age) without any other personal information being revealed.

In step 703, user 102 sends the selected attribute values to verifier 105.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for facilitating the generating of digital identity documents, the method comprising:
   receiving a selection and initialization of properties to be used in a digital identity document, wherein said properties comprise identity attributes, document types and a service uniform resource locator;
   building, by a processor, a template using said selected properties, wherein said template is to be used to construct a particular digital identity document;
   presenting a list of built templates to a user or a verifier to select;
   receiving a notification of a template selected by said user or said verifier from said list of templates to be used in generating a corresponding digital identity document;
   providing an acquisition uniform resource locator associated with said selected template to said user or said verifier to be used by said user or said verifier to request said digital identity document from an issuer, wherein said issuer constructs said digital identity document using said template selected by said user or said verifier, wherein said issuer is a government agency;
   receiving said digital identity document from said issuer; and
   delivering said received digital identity document to said user or said verifier.

2. The method as recited in claim 1, wherein said digital identity document comprises a document or card that is used to identify a person or verify aspects of a person's personal identity in digital form, wherein said properties further comprise alternate views for displaying said digital identity document.

3. The method as recited in claim 1, wherein said digital identity document comprises a document in digital form that lists one or more identity attributes and/or one or more identity document types that said verifier has authority to request, wherein said properties further comprise a role.

4. The method as recited in claim 1, wherein said acquisition uniform resource locator is a property of said selected template, wherein said service uniform resource locator is also a property of said selected template.

5. The method as recited in claim 1 further comprising:
   delivering said received digital identity document to said user using a layout specified as a property in said selected template.

6. The method as recited in claim 1, wherein said user selects which attribute values in said digital identity document delivered to said user are to be revealed to said verifier in response to a challenge from said verifier.

7. The method as recited in claim 1 further comprising:
   receiving said digital identity document from said issuer after said issuer confirms said verifier has authority to obtain a requested role.

8. A computer program product for facilitating the generating of digital identity documents, the computer program product comprising a computer readable storage medium having program code embodied therewith, the program code comprising the programming instructions for:
   receiving a selection and initialization of properties to be used in a digital identity document, wherein said properties comprise identity attributes, document types and a service uniform resource locator;
   building a template using said selected properties, wherein said template is to be used to construct a particular digital identity document;
   presenting a list of built templates to a user or a verifier to select;
   receiving a notification of a template selected by said user or said verifier from said list of templates to be used in generating a corresponding digital identity document;
   providing an acquisition uniform resource locator associated with said selected template to said user or said verifier to be used by said user or said verifier to request said digital identity document from an issuer, wherein said issuer constructs said digital identity document using said template selected by said user or said verifier, wherein said issuer is a government agency;
   receiving said digital identity document from said issuer; and
   delivering said received digital identity document to said user or said verifier.

9. The computer program product as recited in claim 8, wherein said digital identity document comprises a document or card that is used to identify a person or verify aspects of a person's personal identity in digital form, wherein said properties further comprise alternate views for displaying said digital identity document.

10. The computer program product as recited in claim 8, wherein said digital identity document comprises a document in digital form that lists one or more identity attributes and/or one or more identity document types that said verifier has authority to request, wherein said properties further comprise a role.

11. The computer program product as recited in claim 8, wherein said acquisition uniform resource locator is a property of said selected template, wherein said service uniform resource locator is also a property of said selected template.

12. The computer program product as recited in claim 8, wherein the program code further comprises the programming instructions for:
   delivering said received digital identity document to said user using a layout specified as a property in said selected template.

13. The computer program product as recited in claim 8, wherein said user selects which attribute values in said digital identity document delivered to said user are to be revealed to said verifier in response to a challenge from said verifier.

14. The computer program product as recited in claim 8, wherein the program code further comprises the programming instructions for:
   receiving said digital identity document from said issuer after said issuer confirms said verifier has authority to obtain a requested role.

15. A system, comprising:
   a memory unit for storing a computer program for facilitating the generating of digital identity documents; and
   a processor coupled to the memory unit, wherein the processor is configured to execute the program instructions of the computer program comprising:
      receiving a selection and initialization of properties to be used in a digital identity document, wherein said properties comprise identity attributes, document types and a service uniform resource locator;
      building a template using said selected properties, wherein said template is to be used to construct a particular digital identity document;
      presenting a list of built templates to a user or a verifier to select;

receiving a notification of a template selected by said user or said verifier from said list of templates to be used in generating a corresponding digital identity document;

providing an acquisition uniform resource locator associated with said selected template to said user or said verifier to be used by said user or said verifier to request said digital identity document from an issuer, wherein said issuer constructs said digital identity document using said template selected by said user or said verifier, wherein said issuer is a government agency;

receiving said digital identity document from said issuer; and delivering said received digital identity document to said user or said verifier.

16. The system as recited in claim 15, wherein said digital identity document comprises a document or card that is used to identify a person or verify aspects of a person's personal identity in digital form, wherein said properties further comprise alternate views for displaying said digital identity document.

17. The system as recited in claim 15, wherein said digital identity document comprises a document in digital form that lists one or more identity attributes and/or one or more identity document types that said verifier has authority to request, wherein said properties further comprise a role.

18. The system as recited in claim 15, wherein said acquisition uniform resource locator is a property of said selected template, wherein said service uniform resource locator is also a property of said selected template.

19. The system as recited in claim 15, wherein the program instructions of the computer program further comprise:

delivering said received digital identity document to said user using a layout specified as a property in said selected template.

20. The system as recited in claim 15, wherein said user selects which attribute values in said digital identity document delivered to said user are to be revealed to said verifier in response to a challenge from said verifier.

* * * * *